(12) United States Patent
Dragon

(10) Patent No.: US 6,940,046 B2
(45) Date of Patent: Sep. 6, 2005

(54) METHODS OF AND APPARATUS FOR JOINING PROFILE SECTIONS BY DIFFERENTIALLY HEATING THE PROFILE SECTIONS AND CONNECTING MATERIAL

(75) Inventor: Horst Dragon, Moenchengladbach (DE)

(73) Assignee: GenCorp Property Inc., Sacramento, CA (US)

(*) Notice: Subject to any disclaimer, the term of this patent is extended or adjusted under 35 U.S.C. 154(b) by 0 days.

(21) Appl. No.: 10/258,912
(22) PCT Filed: Mar. 15, 2001
(86) PCT No.: PCT/IB01/00372
§ 371 (c)(1), (2), (4) Date: Apr. 10, 2003
(87) PCT Pub. No.: WO01/89810
PCT Pub. Date: Nov. 29, 2001

(65) Prior Publication Data
US 2003/0155340 A1 Aug. 21, 2003

(30) Foreign Application Priority Data
May 24, 2000 (GB) .............................................. 0012654

(51) Int. Cl.$^7$ ............................. H05B 3/00; B29C 65/00
(52) U.S. Cl. .................. 219/243; 156/272.2; 156/304.2
(58) Field of Search .......................... 219/243, 476–480; 392/418; 156/272.2, 304.2, 304.1, 380.9

(56) References Cited

U.S. PATENT DOCUMENTS

| | | | |
|---|---|---|---|
| 3,400,030 A | | 9/1968 | Burger |
| 4,737,214 A | * | 4/1988 | Leurink et al. ............. 156/158 |
| 4,929,293 A | * | 5/1990 | Osgar .......................... 156/158 |
| 5,241,157 A | * | 8/1993 | Wermelinger et al. ...... 219/243 |
| 5,329,094 A | * | 7/1994 | Murphy et al. ............. 219/243 |
| 5,793,017 A | * | 8/1998 | Yamada et al. ............. 219/221 |
| 5,855,720 A | * | 1/1999 | Johnson et al. .......... 156/272.2 |
| 6,596,122 B1 | * | 7/2003 | Savitski et al. .......... 156/304.2 |

FOREIGN PATENT DOCUMENTS

| | | | |
|---|---|---|---|
| DE | 30 12 387 | | 10/1981 |
| DE | 39 06278 | | 8/1990 |
| EP | 0 665 261 | | 8/1995 |
| GB | 2 304 072 | | 12/1997 |
| GE | 514671 | * | 6/1954 ................. 392/440 |
| WO | WO 95/25629 | | 9/1995 |

* cited by examiner

Primary Examiner—John A. Jeffery
(74) Attorney, Agent, or Firm—Leydig, Voit & Mayer, Ltd.

(57) ABSTRACT

A method and apparatus for joining the ends of two profile sections (5, 6) such as two sealing, trimming or finishing strips for use in motor vehicle body construction, is shown. The two profile sections (5, 6) are clamped in respective retaining devices (18, 20) and a length of heat-responsive foil-like material (24) is unwound from a roll (22) into a position between the facing ends of the profile sections. Heaters (26–32) carried by a heater unit (34) are then moved into position between the ends of the profile sections (5, 6) and the foil (24). The outermost heaters (26, 30) heat the ends of the profile sections, and the innermost heaters (28, 32) heat the foil. The heaters (26 to 32) are then withdrawn, and the two retaining devices (18, 20) are then moved towards each other so as to move the ends of the two profile sections into contact with opposite sides of the heated foil (24) which thus heat-bonds the ends of the profile sections together. The retaining devices (18, 20) are then opened to release the joined profile sections. The heaters (26 to 32) are non-contact type heaters to avoid contaminating the foil or the ends of the profile sections. The use of the separate heaters allows the foil (24) to be heated to a temperature which is different from that of the ends of the profile sections, to achieve optimum bonding.

7 Claims, 1 Drawing Sheet

METHODS OF AND APPARATUS FOR JOINING PROFILE SECTIONS BY DIFFERENTIALLY HEATING THE PROFILE SECTIONS AND CONNECTING MATERIAL

FIELD OF INVENTION

The invention relates to methods and apparatus for joining two profile sections, and more specifically, for example, for joining two ends of a sealing, trimming and finishing strip for forming an endless loop, ready for installation onto, for example, the door frame of a vehicle body.

BACKGROUND OF INVENTION

Known methods for joining profile sections are shown in DE 3906278, which shows a method and apparatus for joining sections by clamping the sections in retaining means, placing a heat-sensitive connecting foil on the cut ends of the sections to be joined, heating the ends and pressing the ends together to form the joint. U.S. Pat. No. 3,400,030 shows a method for butt splicing the ends of elongated rubber articles by clamping the ends in retaining means, applying a layer of adhesive to the ends by means of a paddle and pressing the ends together, heat being applied to the ends through the retaining means.

BRIEF SUMMARY OF THE INVENTION

According to the invention, there is provided a method of forming a joint between respective ends of two profile sections, comprising the steps of holding the profile sections, positioning heat-responsive connecting material between the ends of the profile sections, heating the connecting material and the ends of the profile sections, and moving the profile sections towards each other so that the heated ends make contact with the heated connecting material whereby the connecting material bonds the ends of the profile sections together, the heating step applying different amounts of heat to the connecting material and to the ends of the profile sections.

According to the invention, there is also provided a method of forming a joint between respective ends of two profile sections, comprising the steps of holding the profile sections, positioning heat-responsive connecting material between the profile sections, contactlessly heating the connecting material and the ends of the profile sections, and moving the profile sections towards each other so that the heated ends make contact with the heated connecting material whereby the connecting material bonds the ends of the profile sections together.

According to the invention, there is further provided apparatus for forming a joint between respective ends of two profile sections, comprising retaining means for holding the profile sections, means for positioning heat-responsive connecting material between the profile sections, heating means for heating the connecting material and the ends of the profile sections, and means for moving the retaining means towards each other so that the heated ends of the profile sections make contact with the heated connecting material whereby the connecting material bonds the ends of the profile sections together, the heating means being adapted to apply a different amount of heat to the connecting material and to the ends of the profile sections.

According to the invention, there is still further provided apparatus for forming a joint between respective ends of two profile sections, comprising retaining means for holding the profile sections, means for positioning heat-responsive connecting material between the profile sections, heating means for heating the connecting material and the ends of the profile sections, and means for moving the retaining means towards each other so that the heated ends of the profile sections make contact with the heated connecting material whereby the connecting material bonds the ends of the profile sections together, the heating means being separate from the retaining means and applying substantially no heat to any part of the profile sections when held in the retaining means other than the said ends thereof.

According to the invention, there is yet further provided apparatus for forming a joint between respective ends of two profile sections, comprising retaining means for holding the profile sections, means for positioning heat-responsive material between the profile sections, heating means for non-contactingly heating the connecting material and the ends of the profile sections, and means for moving the retaining means towards each other so that the heated ends of the profile sections make contact with the heated connected material whereby the connecting material bonds the ends of the profile sections together.

BRIEF DESCRIPTION THE DRA WINGS

Methods and apparatus according to the invention for forming a joint between two profile sections will now be described, by way of example only, with reference to the accompanying diagrammatic drawings in which.

DETAILED DESCRIPTION OF EMBODIMENTS OF THE INVENTION

Figure 1:
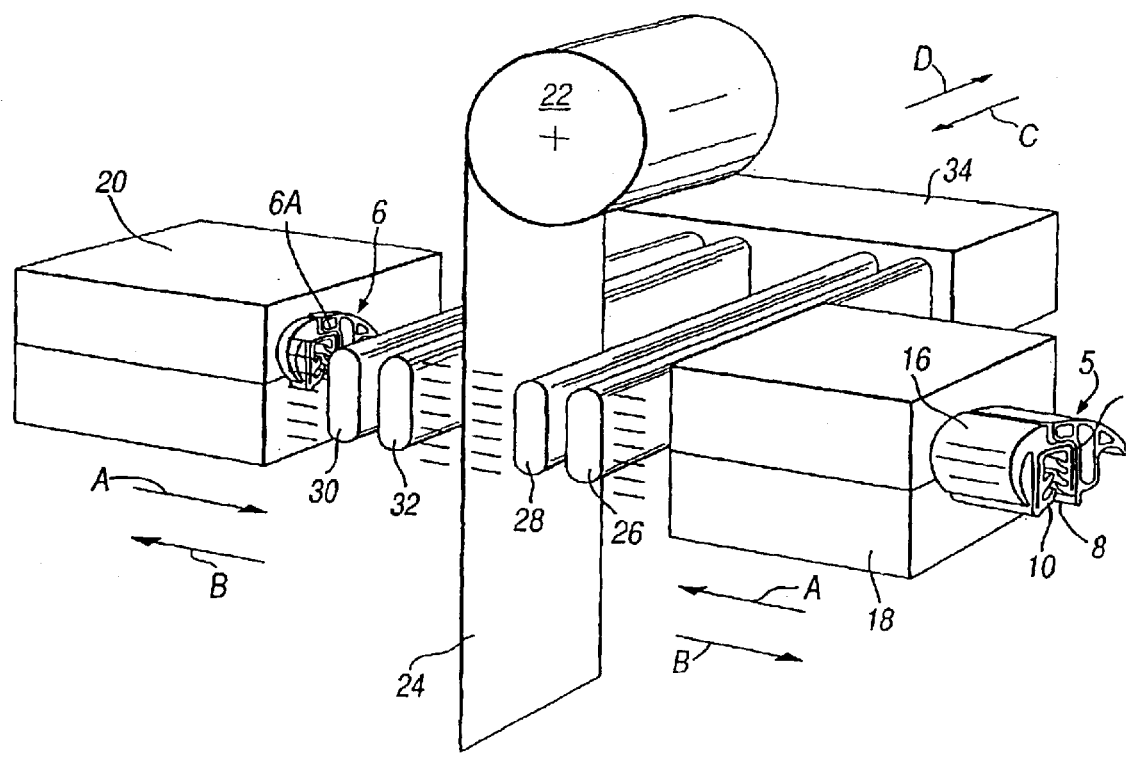
FIG. 1 is a perspective view of one form of apparatus.

In the apparatus shown in FIG. 1, the two profile sections 5,6 to be joined are in the form of sealing, trimming or finishing strips for use in motor vehicle body construction and, more particularly, for forming seals around door openings. Each profile section comprises extruded plastics or rubber or similar material defining a channel 8 (the channel of the profile section 6 is not easily visible in FIG. 1) which, in use, embracingly grips a frame of the door opening such as formed by a flange surrounding the opening where the inner and outer body panels of the vehicle are joined together. The extruded material preferably defines integral gripping lips 10 extending across the interior of the channel 8 from the opposite facing walls thereof, these lips frictionally contacting the frame or flange in use to help to secure the strip in position thereon. The extruded material defining the channel 8 may be reinforced with a channel-shaped embedded resilient core or carrier 12 such as made of metal. As shown in FIG. 1, the sealing strip carries a relatively soft sealing part 14 extending from the outside of one side wall of the channel 8. When the sealing strip is mounted on the frame or flange of the door opening, this sealing part 8 is positioned so as to be partially compressed by the closing door, thus providing a weatherseal around the door opening. A so-called "cosmetic lip" 16 extends over the outside of the opposite side wall of the channel 8 for receiving and hiding the edge of a trim panel on the interior of the vehicle body.

Referring in more detail to FIG. 1, the apparatus comprises two retaining devices 18,20 for receiving and clamping the profile sections 5,6. The retaining devices 18,20 can be opened to receive the profile sections 5,6 and then closed to clamp the profile sections in position. The retaining devices 18,20 are mounted on slides or similar mechanism (not shown) so as to be slidable in the directions of the arrows A and B to bring the ends of the clamped profile sections 5,6 towards and away from each other. A roll 22 of a thermoplastic foil or film is mounted between and above the two retaining devices 18,20 by supporting means (not shown). The foil can be drawn off the roll 22 as shown at 24.

On each side of the path of the foil 24, a respective pair of heaters 26,28 and 30,32 is positioned, the four heaters 26 to 32 being mounted on a movable heating unit 34, the heater unit 34 being movable to and fro in the directions of the arrows C and D so that the heaters 26 to 32 can be moved in the direction C into the position shown in FIG. 1 and moved in the direction D so that they are clear of the space between the two retaining devices 18,20.

The foil 24 may be made from a polyolefin material or other suitable thermoplastic material.

In use, the two profile sections 5,6, the ends of which are to be joined, are clamped in the retaining devices 18 and 20 so that the ends to be joined protrude towards each other from the retaining devices. A length of the foil 24 is unwound from the roll 22, generally into the position shown in FIG. 1. The heater unit 34 is moved in the direction of the arrow C so as to position the heaters 26 to 32 in the positions shown in the FIG. The heaters are then activated. The two outermost heaters 26 and 30 cause heating of the ends of the profile sections 5 and 6 while the two innermost heaters 28 and 32 heat the foil 24.

Figure 2:
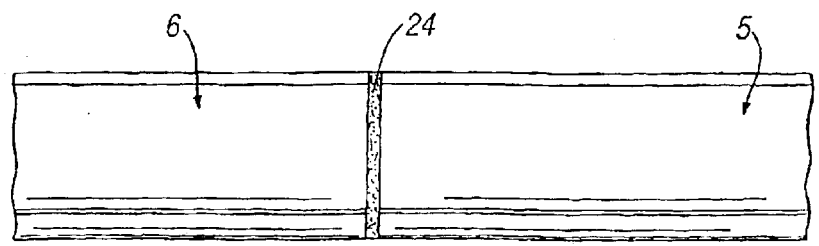
FIG. 2 is a cross-section through two profile sections joined by the apparatus of FIG. 1.

The heater unit 34 is then withdrawn in the direction D so that the heaters 26 to 32 are clear of the spaces between the retaining devices 18,20 and the foil 24. The retaining devices 18,20 are then caused to move towards each other so as to bring the ends of the profile sections 5,6 into contact with opposite sides of the foil 24 with a predetermined amount of pressure. The heated foil 24 thus thermally bonds the two ends of the profile sections 5 and 6 firmly together, as shown in FIG. 2. The retaining devices 18,20 are then opened to release the joined profile sections.

In order to achieve satisfactory bonding, it is of course necessary for the foil 24 and the ends of the profile sections 5,6 to be heated to the required temperature levels. Because the heaters 26 and 30 for heating the ends of the profile sections 5,6 are separate from the heaters 28 and 32 for heating the foil 24, a different amount of different amounts of heat may be applied to the ends of the profile sections than is applied to the foil. Thus, for example, the heaters 26,30 can apply heat at a temperature which is different from that of the heat applied by the heaters 28,32. Instead, the heaters 26,30 could apply heat at the same temperature as the heaters 28,32 but for a different time period, taking into account the different masses of the foil and the ends of the profile sections. Each part can thus be heated to the appropriate temperature for effective bonding.

Because the heaters 26 and 30 apply heat directly and substantially only to the ends of the profile sections, the risk of damage to the profile sections by such heating is minimised. The arrangement shown thus contrasts with other arrangements in which the ends of the profile sections are heated by raising the temperature of the retaining devices 18 and 20. In such other arrangements, there is a risk that the profile sections will be damaged, particularly where surfaces of the profile sections are covered with flock or other surface finishes which may be damaged by excessive heat.

It will be noted that the heaters 26 and 32 preferably do not make contact with the profile sections or the foil. The heaters may, for example, employ radiant heat. Because there is no physical contact, the risk of contamination of the ends of the profile sections or of the foil is minimised.

Various modifications may be made. For example, although both heaters 26 and 30 may be required, it may be possible to use only one heater 28 or 32 for heating the foil. It may also be possible to replace each pair of heaters 26,28 and 30,32 with a single heater which is arranged to radiate respectively different amounts of heat to the adjacent profile section end and to the foil, so as to achieve the required different temperature levels.

The foil 24 may be of any suitable type for ensuring an effective bond, taking into account the material and characteristics of the profile sections. It may, for example, have a melting point between 120 and 130° C. The apparatus and method described can provide a very quick curing joint (in four to five seconds) and which is immediately capable of withstanding loads. The need for vulcanisation is avoided.

What is claimed is:

1. Apparatus for forming a joint between respective ends of two profile sections utilizing heat-responsive connecting material, comprising retaining means for holding the profile sections so that said ends face towards each other but with a predetermined space therebetween, positioning means for positioning the heat-responsive connecting material between the profile sections and in said space, first heating means for heating the connecting material, second, separate, heating means for heating the ends of the profile sections, means for moving the first heating means into said space for applying a first predetermined amount of heat to the connecting material, means for moving the second heating means into said space for applying a second predetermined amount of heat, different from the first predetermined amount of heat, to the ends of the profile sections, means for moving the first and second heating means out of said space after the predetermined amounts of heat have been respectively applied to the connecting material and to the ends of the profile sections, and means for moving the retaining means towards each other so that the heated ends of the profile sections move through said space and make contact with the heated connecting material whereby the connecting material bonds the ends of the profile sections together, wherein the first and second heating means comprise means operative to apply the same temperature to the connecting material and the ends of the profile sections, but for different lengths of time.

2. Apparatus according to claim 1, wherein the first and second heating means are separate from the retaining means and apply substantially no heat to any part of the profile sections when held in the retaining means other than said ends thereof.

3. Apparatus according to claim 1, wherein the first and second heating means comprise contactless heating means.

4. Apparatus according to claim 1, wherein the first heating means comprises a first pair of separate heaters each for heating the connecting material, said means for moving the first heating means comprising means for moving the heaters of the first pair of heaters into said space and on respectively opposite sides of the connecting material, and the second, separate, heating means comprises a second pair of separate heaters, different from the heaters of the first heating means, each said separate heater of said second pair of separate heaters for heating a respective one of the ends of the profile sections, the means for moving the second heating means comprising means for moving the separate heaters of the second heating means into said space and on respectively opposite sides of the connecting material, each heater of the second heating means being moved into a position between a respective one of the heaters of the first heating means and a respective one of the ends of the profile sections.

5. Apparatus according to claim 1, wherein the heat-responsive connecting material is a thermoplastic material.

6. Apparatus according to claim 5, wherein the connecting material is a foil.

7. Apparatus for forming a joint between respective ends of two profile sections utilising heat-responsive connecting material, comprising retaining means each for holding a region of a respective one of the profile sections adjacent said end thereof so that said ends respectively project from the retaining means and face towards each other but with a predetermined space therebetween, positioning means for positioning the heat-responsive connecting material between the profile sections and in said space, a first pair of separate heaters for heating the connecting material, a second pair of separate heaters which are separate from the first heaters and for heating the ends of the profile sections, means for moving the separate heaters of said first pair of separate heaters into said space on respectively opposite sides of the connecting material for applying a first predetermined amount of heat to the connecting material, means for moving the separate heaters of said second pair of separate heaters into said space on respectively opposite sides of the connecting material, each heater of the second pair of separate heaters being moved into a position between a respective one of the heaters of the first pair of separate heaters and a respective one of the ends of the profile sections for applying a second predetermined amount of heat, different from the first predetermined amount of heat, to that profile section end, each of the heaters of the first pair of separate heaters applying a predetermined temperature to the connecting material for a predetermined length of time, and each of the heaters of the second pair of separate heaters applying a temperature substantially the same as said predetermined temperature to the ends of the profile sections but for a length of time which is different from said predetermined length of time, whereby the heaters of the first pair of separate heaters apply said first predetermined amount of heat to the connecting material and the heaters of the second pair of separate heaters apply said second predetermined amount of heat to the ends of the profile sections, means for moving the heaters of the first and second pairs of separate heaters out of said space after the predetermined amounts of heat have been respectively applied to the connecting material and the ends of the profile sections, and means for moving the retaining means towards each other so that the heated ends of the profile sections move through said space and make contact with opposite sides of the heated connecting material whereby the connecting material bonds the ends of the profile sections together, the retaining means receiving and embracing said regions of the profile sections whereby the heaters of the first and second pair of separate heaters apply substantially no heat to any part of the profile sections when held in the retaining means other than said ends thereof.

* * * * *